UNITED STATES PATENT OFFICE 2,496,462

PROCESS OF ROASTING WHOLE NUTS

George A. Fisher, Selinsgrove, Pa., assignor to Wm. S. Scull Company, Camden, N. J., a corporation of New Jersey No Drawing. Application July 5, 1947, Serial No. 759,310

4 Claims. (Cl. 99—126)

My invention relates to the treatment of whole nuts with butter and has for its primary object the provision of an improved method of treatment of whole nuts which will inhibit rancidity, improve the flavor and, in the case of salted nuts, will provide an evenly salted nut and one to which the salt will adhere much better than is possible in present practice.

In my improved process the nuts are first shelled, roasted and skinned. Next the roasted nuts are placed in a coating apparatus which can be in the form of a revolving drum or pill coater. The drum is revolved at a slow speed to gently agitate the nuts and while being agitated the nuts are brought into contact with melted butter which has previously been treated in a manner to be described. This butter can either be poured into the revolving drum or sprayed onto the nuts in the drums. When the nuts have been covered with a film of the melted butter very fine salt is sprinkled into the drum onto the nuts and after a short period the nuts become evenly coated with the salt and are then removed from the drum.

The most important feature of my improved method is the pre-treatment of the butter which is used. I use a good grade of whole creamery butter and it is to be noted that whole butter must be used and not butter fat. In the preferred method the butter is first subjected to a low heat to drive off the moisture and better results are obtained if the moisture is driven off slowly. For example, with 60 pounds of butter I keep the heat low enough so that the moisture will not be completely evaporated in less than half an hour or even longer. After the moisture has been evaporated, the temperature of the butter is raised preferably to about 320° F. and held at this temperature for a period of ten to twenty minutes and at the end of the heating period the butter in melted condition is applied to the nuts in the manner described above.

It will be understood of course that the butter can be heated more rapidly and to a higher or lower temperature and I therefore do not limit myself to treatment at 320° for ten to twenty minutes after the moisture is driven off. Good results can be secured in the range between 250° for a period of fifteen to twenty minutes and 400° for a period of about ten minutes and, as a matter of fact, to secure the best anti-oxygenic qualities the most effective temperature-time relationship is the latter. However, the 400° F.-ten minute treatment does not give the best flavor and the extent of variation from this relation will depend on how far it is practical to sacrifice the anti-oxygenic qualities to improve flavor.

I am unable to explain why it is that the treatment of nuts with the whole butter treated as above described produces the excellent results which I have secured. The use of butter fat as distinguished from whole butter produces very unsatisfactory results and as a matter of fact the oxidation is much more rapid if heated butter fat is used; even more rapid, in fact, than when unheated whole butter is used. Whatever the explanation for the factors responsible for producing the anti-oxygenic effects may be, there is no question that the ultimate nut product is much improved. It also appears to be the case that the application of the film of the butter to the nuts inhibits the natural oil of the nut from turning rancid.

In addition to the marked improvement in flavor of nuts treated in the manner described, I have also found that the butter treated as described seems to be a much better vehicle for holding the salt on the nuts than the oil used in the ordinary commercial practice.

I claim:

1. The method of preparing salted whole nuts which comprises roasting the nuts, thereafter applying to the roasted nuts whole butter which has been heated at a low temperature until substantially all of the moisture is driven off and thereafter heated to a temerature between 250° F. and 400° F. for a period of ten to twenty minutes and applying salt to the nuts.

2. The method of claim 1 wherein the nuts are gently agitated while the butter is being applied.

3. The method of preparing salted whole nuts which comprises roasting the nuts, thereafter applying to the roasted nuts whole butter which has been heated at a low temperature until substantially all of the moisture is driven off and thereafter heated to a temperature of 320° F. for a period of ten to twenty minutes and applying the salt to the nuts.

4. The method of claim 3 wherein the nuts are gently agitated while the butter is being applied.

GEORGE A. FISHER.

REFERENCES CITED

The following references are of record in the file of this patent:

UNITED STATES PATENTS

| Number | Name | Date |
|---|---|---|
| 2,418,645 | Jakobsen | Apr. 8, 1947 |

OTHER REFERENCES

"800 Proved Pecan Recipes," 1925.